Patented Apr. 27, 1943

2,317,797

UNITED STATES PATENT OFFICE 2,317,797

METHOD OF TREATING TALL OIL AND PRODUCT OBTAINED THEREBY

Anthony F. Oliver and Robert C. Palmer, Pensacola, Fla., assignors to Newport Industries, Inc., Pensacola, Fla., a corporation of Delaware No Drawing. Application April 5, 1940, Serial No. 328,030

4 Claims. (Cl. 260—97.5)

This invention relates to a method of treating tall oil and to the product obtained thereby. More particularly, the invention relates to the desulfurizing of tall oil containing sulfur, preliminary to hydrogenating tall oil, and to the desulfurized tall oil obtained thereby.

Crude tall oil, obtained as a byproduct in the manufacture of pulp by the sulfate process, is a dark, evil smelling liquid consisting of a mixture of largely unsaturated fatty acids, such as oleic, linoleic and linolenic acid, and resin acids, the fatty and resin acids being present in roughly equal proportions, together with minor proportions of unsaponifiable matter, chiefly plant sterols. The evil smell is probably due to sulfur compounds present in the crude tall oil.

It has heretofore been proposed to subject tall oil to a slight amount of hydrogenation for the purpose of removing unpleasant odors therefrom. We have, however, described in our copending application, entitled "Method of isolating fatty acids from tall oil," Serial No. 304,580, filed November 15, 1939, a method of obtaining commercially valuable hard fatty acids and abietic acid from tall oil by a substantially complete hydrogenation of the tall oil, followed by fractional crystallization or distillation. This is a continuation-in-part of the earlier filed application.

In order to obtain substantially complete hydrogenation of tall oil in a commercially economical way, we have found that it is very desirable first to desulfurize the tall oil. The desulfurization of the tall oil preferably also includes a decolorization of the tall oil.

Desulfurization of tall oil in accordance with our present method may be carried out in a sequence of steps, one or more of which includes a simultaneous decolorizing or bleaching of the tall oil as a desirable incident thereto. These steps comprise, in general, first filtering a solution of crude tall oil in an aliphatic hydrocarbon, such as petroleum naphtha, through a stationary bed of an adsorbent medium, such as fuller's earth, activated bentonite, or other decolorizing clay or adsorbent material, activated carbon, or the like; then, after removal of the aliphatic hydrocarbon solvent, subjecting the tall oil to a heat treatment; and finally removing the last traces of sulfur from the tall oil by reacting such sulfur with one or more heavy metals capable of forming insoluble sulfides that can be precipitated out and filtered or otherwise removed from the tall oil.

Both of the first two steps involve some decolorizing or bleaching effect along with a partial removal of the sulfur present in the tall oil. All of the sulfur present cannot be economically removed from the tall oil by these first two steps, either performed separately or in conjunction with each other. However, by a combination of all three steps, or by the treatment with heavy metals alone, a practically complete removal of sulfur from the tall oil can be effected. This enables the subsequent hydrogenation step to be carried out with an economical use of the hydrogenation catalyst to produce a substantially completely hydrogenated tall oil product.

It is therefore an important object of this invention to provide a method of desulfurizing tall oil containing sulfur in order that the subsequent hydrogenation of the fatty acid content of the tall oil may be carried to substantial completion with economic use of the hydrogenation catalyst.

It is a further important object of this invention to provide a decolorized and desulfurized tall oil, suitable for use as such or for further processing, including a hydrogenation step, to obtain hard fatty acids therefrom.

It is a further important object of this invention to provide a decolorized, desulfurized hydrogenated tall oil product.

Other and further important objects of this invention will become apparent from the following description and appended claims.

In accordance with the present invention, crude tall oil is subjected to a sequence of steps for the substantially complete removal of sulfur therefrom. The initial step preferably comprises subjecting crude tall oil to filtration through a bed of an adsorbent medium, such as an adsorbent clay, as for instance fuller's earth, or activated charcoal, or the like. In this preliminary treatment, a substantial amount of sulfur is removed from the crude tall oil, but it is not practical to attempt to remove all of the sulfur in this step. A very substantial amount of decolorization also occurs during this initial step.

In the second step, the partially decolorized and partially desulfurized tall oil is subjected to heat treatment at a temperature of around 260 to 325° C. for a period of time ranging from 8 hours at the lower temperatures to as little as 10 minutes at the higher temperatures. An appreciable amount of sulfur is eliminated as hydrogen sulfide during this heat treatment, but it is not feasible to attempt to remove all of the sulfur originally present in the crude tall oil by this heat treatment alone. A certain amount of bleaching also takes place during the heat treatment.

In the third, and preferably final step, the last traces of sulfur are removed by treatment at an elevated temperature with metals capable of forming compounds with sulfur that are insoluble in tall oil, particularly the so-called heavy metals, such as nickel, copper, lead, bismuth and cadmium. The treatment with compounds of heavy metals is preferably carried out at an elevated temperature, substantially above 150° C. with an upper limit of 300° C., and the metallic sulfur compounds formed are precipitated out and the tall oil is cooled to a temperature of around 100° C. to facilitate its handling in the subsequent step of removing the insoluble metal-sulfur compounds. The precipitated sulfur compounds of the heavy metals may then be removed from the tall oil, as by a simple filtration step, or by filtration through a thin bed of fuller's earth, or other adsorbent medium, such as activated carbon, or a separation of the insoluble sulfur compounds of the metal may be effected in any other suitable way, as by decantation, centrifuging, or the like.

The following example will serve to illustrate a preferred embodiment of our invention, parts being given by weight except where otherwise specified:

100 parts of crude tall oil are dissolved in an aliphatic hydrocarbon, such as petroleum naphtha, to give an 18% solution of the crude tall oil. This solution of tall oil in petroleum naphtha is then filtered through a stationary bed of fuller's earth containing at least an equal amount by weight of the tall oil, or 100 parts, of fuller's earth. Substantially all of the oxidized bodies and a major proportion of the sulfur compounds present in the crude tall oil are removed by this filtration step. Certain solid insoluble color bodies amounting to about 1.5% of the crude tall oil are precipitated from the initial petroleum solution and may be separated by decantation prior to the filtration through fuller's earth.

The extent of desulfurization effected can be controlled in some measure by the amount of fuller's earth used, although complete desulfurization is practically impossible by this means alone. A suitable ratio of fuller's earth to tall oil is 2 parts to 1. After filtration through the fuller's earth and after removal of the petroleum naphtha, an 80% yield of pale tall oil is obtained. The 20% of crude tall oil retained by the fuller's earth consists of a black, evil smelling liquid, somewhat more viscous than the original crude tall oil and containing a major proportion of the sulfur present initially.

The following analyses will illustrate the effect of the hereinabove outlined treatment with fuller's earth:

Crude tall oil

| | |
|---|---|
| Specific gravity at 25° C | 0.980 |
| Acid value | 167.2 |
| Color (Hellige Klett scale) | 9L-9 |
| Viscosity (Gardner-Holdt scale) | Q |
| Per cent fatty acids | 52.2 |
| Per cent resin acids | 38.8 |
| Per cent naphtha insoluble | 1.5 |
| Per cent bound sulfur | 0.08 |

Tall oil treated with 2 parts fuller's earth

| | |
|---|---|
| Per cent yield | 80.0 |
| Acid value | 173.0 |
| Color (Hellige Klett scale) | 4L |
| Viscosity (Gardner-Holdt scale) | M |
| Saponification value | 178.5 |
| Ester value | 5.5 |
| Per cent unsaponifiable matter | 6.5 |
| Per cent resin acids | 37.5 |
| Per cent fatty acids | 53.0 |
| Per cent bound sulfur | 0.02 |

The 80 parts of pale, nearly odorless tall oil, resulting from the foregoing filtration step, are next subjected to heat treatment at a temperature of 280 to 285° C. for approximately a half hour. All of the fuller's earth should be completely removed from the tall oil before subjecting it to this heat treatment step. During the heat treatment, a large part of the residual sulfur is eliminated as hydrogen sulfide, but a more complete removal of hydrogen sulfide can be effected by steaming the heat treated tall oil.

Without any substantial cooling of the tall oil, following the heat treatment step, 0.1% to 0.2% of a mixture of copper and nickel formate is added to the tall oil and heating continued at about 220° C. for ½ hour. On addition of the copper and nickel formate, the tall oil turns black, showing the formation of sulfides of copper and nickel. The mass is then cooled to about 100° C., say 105° C., and filtered through a thin bed of fuller's earth to remove the precipitated copper and nickel sulfides.

The tall oil obtained as a result of the above sequence of steps is completely freed from sulfur, as evidenced by the fact that heating with litharge shows no darkening of the tall oil. The amount of copper and nickel formate, or other heavy metal compounds, required to completely remove the sulfur from tall oil will vary, of course, depending upon the amount of sulfur initially present. If crude tall oil is directly treated with heavy metal compounds, without a preliminary filtration through an adsorbent medium and heat treatment, as much as ½ to 1% of copper and nickel formate may be required, whereas if the tall oil has already been subjected to filtration through an adsorbent medium and to the heat treatment step, as little as 0.1%, or even less, of the heavy metal compounds may be required. If a lead compound, such as litharge, is used instead of the copper and nickel formates, any excess lead should be completely removed to prevent poisoning of the hydrogenation catalyst. It is not necessary, when using copper and nickel, to add these in the form of their formates, since oxides of these metals can be added instead. However, better initial dispersion of the metals is obtained if the tall oil-soluble formates are employed.

Obviously, the extent of the treatment of the tall oil with fuller's earth, with heat, and with heavy metal compounds capable of reacting to form insoluble sulfides, may be varied considerably, the intensity of one form of treatment being compensated for by a less intense treatment in another step, or vice versa. Either or both of the first two steps of filtering through fuller's earth and heat treating may be completely omitted, and desulfurization effected by means of heavy metal compounds alone, or in combination with only one of the first two steps, but not so satisfactorily as by a combination of all three steps.

The substantially completely desulfurized tall oil may next be subjected to hydrogenation to effect a partial or complete saturation of the fatty acids and resin acids present in the tall oil. Hydrogenation, in accordance with our method, is effected in the liquid phase, under pressure, by means of conventional hydrogenation catalysts. Suitable conditions include hydrogen pressures up to 500 lbs. per sq. in. at temperatures ranging from 85 to 125° C., with a maximum temperature of from 150 to 160° C. Preferably, the desulfurized tall oil is hydrogenated at a temperature of 120 to 125° C., with 1⅔% of a mixture of copper and nickel formate, employing a hydrogen pressure up to a maximum of 500 lbs. per sq. in. About 5 parts of mixed copper-nickel (3 to 1 mixture) formates per 300 parts of desulfurized tall oil are employed. If desired, an inert solvent may be used. Other conventional hydrogenation catalysts may be employed.

Under these conditions, absorption of hydrogen commences at a temperature of about 85° C. to 95° C., and becomes rapid at from 100 to 110° C. Most of the hydrogen is absorbed during the first hour of operation. Substantially complete hydrogenation of the fatty acid content of the tall oil is usually effected under these conditions within 6 to 8 hours, about 1% by weight of hydrogen being consumed.

The substantially complete hydrogenation of the fatty acids in the desulfurized tall oil changes the latter from a liquid to a solid, yellowish white mass having a titre of approximately 50° C. The traces of metallic compounds contained in the hydrogenated tall oil may be removed by dissolving the tall oil in naphtha and shaking the warmed naphtha solution with dilute sulfuric acid. Preferably the tall oil, heated to 120 to 140° C., may be treated with 0.2 to 0.3% of oxalic acid, which precipitates the small amounts of dissolved metals as oxalates which are insoluble in the oil and which may then be filtered off by any convenient method. Any excess oxalic acid may be removed by steaming the hydrogenated oil at 150° C. or thereabouts. This gives a hydrogenated tall oil free of metal impurities. The hydrogenated tall oil may also be melted and filtered, at a temperature of about 100° C., through a thin bed of fuller's earth or other filter medium capable of adsorbing the small amounts of metallic compounds dissolved and of removing the suspended catalyst.

The hardened fatty acid, viz., stearic acid, may be separated from the hydrogenated tall oil by a fractional crystallization or fractional distillation in accordance with the method disclosed in the above identified application for patent. The following table will serve to illustrate the results obtained by hydrogenating desulfurized tall oil in accordance with the above disclosed method:

| | |
|---|---|
| Per cent yield hard fatty acid | 50 |
| Acid value of hard fatty acid | 190 |
| Titre of hard fatty acid, in °C | 62.5 |
| Per cent fatty acids in hard fatty acid (Twitchell) | 94 |
| Per cent solvent occluded by hard fatty acid matrix | 56.5 |
| Per cent residue recoverable from filtrate after recovery of hard fatty acid | 50.0 |
| Acid value of residue | 155 |
| Per cent fatty acid in residue | 26.5 |
| Per cent resin acids in residue | 55.5 |
| Per cent unsaponifiable in residue | 18.0 |

In order to establish the value of first desulfurizing tall oil before hydrogenating it, the following oils were prepared for hydrogenation:

(1) Crude tall oil as received.
(2) Desulfurized crude tall oil.
(3) Decolorized and desulfurized tall oil.

In preparing oil (2), the crude tall oil was desulfurized completely by heating it at 260 to 270° C. for 2 hours with ½% of mixed copper and nickel formate. The oil was then cooled to 105° C. and filtered through a thin bed of fuller's earth to removed precipitated sulfides. This oil did not further darken on heating with litharge, thus showing the complete removal of sulfur.

Oil (3) was prepared by earth decolorizing a crude tall oil and heating the oil to 280 to 285° C. for ½ hour to decompose residual color bodies, and the product was then completely desulfurized by reaction with copper and nickel formate in the manner above described.

The oils were then hydrogenated at 120 to 125° C. with 1⅔% of mixed copper and nickel formate, employing hydrogen pressures up to a maximum of 500 lbs. per sq. in. The following table gives the results obtained:

| | Oils subjected to hydrogenation | | |
|---|---|---|---|
| | (1) | (2) | (3) |
| Color (liquid) | 7L-6 | 6 | 1-1L |
| Acid value | 166 | 160.0 | 167 |
| Titre, °C | Below 20 | 40 | 52 |

The foregoing data shows that crude tall oil does not hydrogenate appreciably under conditions which give maximum hydrogenation with decolorized and desulfurized tall oil. The data also show that hydrogenation is more complete in the case of a decolorized and desulfurized tall oil than in the case of a tall oil that has merely been desulfurized but not decolorized. There is thus shown to be true cooperation between the steps of decolorizing, with accompanying partial desulfurization, and of desulfurizing in accordance with the method disclosed herein.

While we prefer to carry the hydrogenation of the desulfurized tall oil to substantial completion in order that it may have a titre above 40° C., for some purposes the hydrogenation need be carried only sufficiently far to produce a hydrogenated tall oil that is solid at say 30° C.

It will, of course, be understood that various details of the process may be varied through a wide range without departing from the principles of this invention and it is, therefore, not the purpose to limit the patent granted hereon otherwise than necessitated by the scope of the appended claims.

We claim as our invention:

1. In a method of preparing tall oil for hydrogenation, the preliminary step of desulfurizing said tall oil including filtering a solution of said tall oil through an adsorbent medium, heat treating the filtered tall oil for from 8 hours to 10 minutes at a temperature between 260° and 325° C., treating said heat treated tall oil with a compound of a heavy metal at a temperature above 150° C. to precipitate out sulfur compounds of said heavy metal, and removing the precipitated sulfur compounds from the oil.

2. The method of desulfurizing tall oil, which comprises subjecting crude tall oil in the sequence of steps named to filtration in solution through an adsorbent earth, to heat treatment for from 8 hours to 10 minutes at a temperature of about 260° to 325° C., to the action of a compound of a heavy metal to form an insoluble sulfur compound with sulfur present in said tall oil and finally to filtration to remove insoluble sulfur compounds of said heavy metal.

3. In a method of preparing tall oil for hydrogenation, the preliminary step of desulfurizing said tall oil including filtering the solution of said tall oil through an adsorbent medium, heat treating the filtered tall oil for from 8 hours to 10 minutes at a temperature between 260° and 325° C., treating said heat treated tall oil with a nickel compound at a temperature above 150° C. to precipitate nickel sulfur compounds and removing said precipitated sulfur compounds from the oil.

4. The method of desulfurizing tall oil which comprises subjecting crude tall oil in the sequence of steps named to filtration in solution through an adsorbent earth, to heat treatment from 8 hours to 10 minutes at a temperature of about 260° to 325° C., to the action of copper compounds to form an insoluble sulfur compound with sulfur present in said tall oil and finally to filtration to remove insoluble copper-sulfur compounds.

ANTHONY F. OLIVER.
ROBERT C. PALMER.